(No Model.)
T. H. HICKS.
SECONDARY BATTERY.
No. 405,213. Patented June 11, 1889.
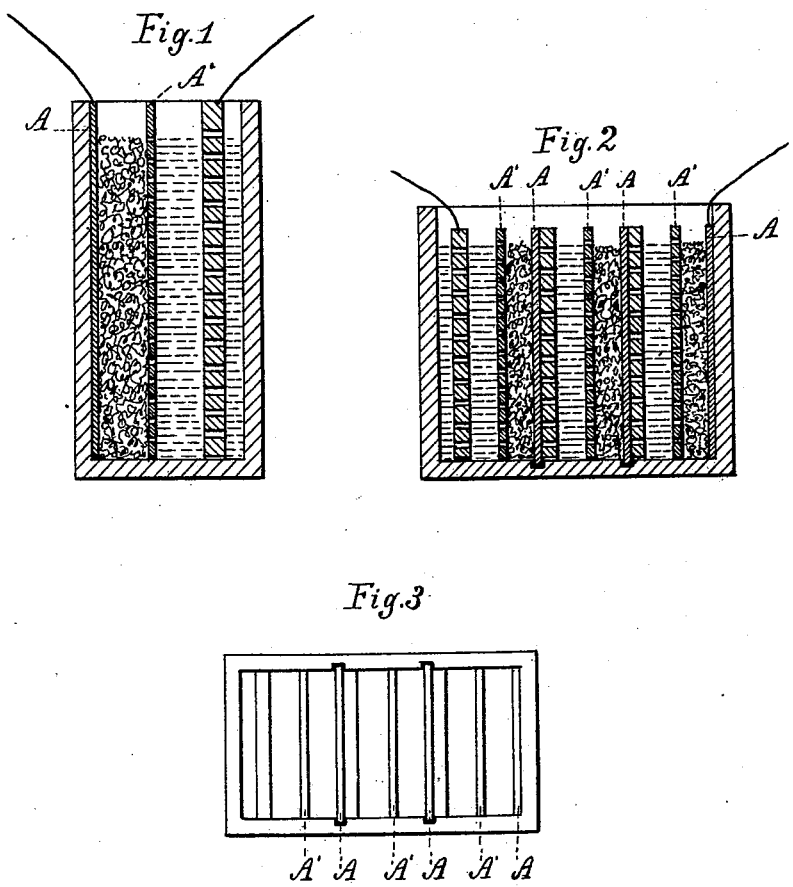
Attest:
John Schuman.
J. Paul Mayer.
Inventor.
Thomas H. Hicks.
By Thos. S. Sprague & Son
Att'y

UNITED STATES PATENT OFFICE.

THOMAS H. HICKS, OF DETROIT, MICHIGAN, ASSIGNOR TO THE HINDS INDUCTION-LIGHT AND MOTOR COMPANY, OF MICHIGAN.

SECONDARY BATTERY.

SPECIFICATION forming part of Letters Patent No. 405,213, dated June 11, 1889.

Application filed August 2, 1888. Serial No. 281,770. (No model.)

*To all whom it may concern:*

Be it known that I, THOMAS H. HICKS, a citizen of the United States, residing at Detroit, in the county of Wayne and State of Michigan, have invented certain new and useful Improvements in Secondary Batteries, of which the following is a specification, reference being had therein to the accompanying drawings.

This invention relates to new and useful improvements in secondary batteries; and the invention consists in the peculiar description of the conducting-bodies, which I make of different materials; and, further, in the composition of the conducting-liquid used in connection with the bodies; and, further, in the combination of the different cells in series, all as more fully hereinafter described, and shown in the accompanying drawings, in which—

Figure 1 is a vertical central section representing one cell. Fig. 2 is a similar section representing a series of cells, and Fig. 3 is a top plan of Fig. 2.

My improved storage-battery or accumulator belongs to that class wherein two conducting bodies of different material are immersed in a conducting-liquid capable of chemically attacking one of them under the influence of an electric current in charging. Each cell consists of two electrodes of different material. The negative electrode is composed of two lead plates A A', the latter being perforated and placed at a distance from the imperforate plate A, and the interval between the two is filled with spongy lead. The positive electrode consists of a plate of carbon, preferably provided with a number of perforations and placed at some distance, depending on the desired electro-motive force, from the negative electrode. The plates are immersed in a liquid consisting of a dilute sulphuric acid, preferably mixed with hydrochloric acid, or any of the salts thereof—such as sal-ammoniac, &c., or ammonia or its combinations.

The lead plate in proximity to the carbon body is perforated to allow the free circulation of the liquid and to compact the spongy lead in electrical contact with the imperforate plate. To place a number of cells in series, I supply a suitably-large vessel, and by means of packing of paraffine, rubber, or other suitable nature applied to the edges of the imperforate lead plates, I form separate tight compartments, which I electrically connect with each other in series by placing the carbon body in contact with the imperforate lead plate, or by any other suitable metallic connection between the two.

I preferably use the chemical elements described, but do not wish to limit myself thereto, but wish to include, also, the chemical equivalents—such as tin—for the lead plate, or its various compositions, and platinum instead of the carbon plate.

What I claim as my invention is—

1. A storage-battery comprising a containing-vessel, a series of perforate carbon electrodes in said vessel, and a series of lead electrodes, each consisting of a mass of spongy lead inclosed on one side by a perforate, on the other side by an imperforate, wall, the imperforate wall being placed against one side of a carbon element and the perforate wall opposing the other side of the next carbon element, and a suitable conducting-liquid.

2. A storage-battery consisting of two dissimilar bodies, one consisting of a perforate and an imperforate lead plate inclosing a body of spongy lead between them, and the other consisting of carbon or its described equivalents, substantially as described.

3. A storage-battery comprising a series of like cells arranged in a common vessel, each cell consisting of a lead and carbon element, a conducting-liquid consisting of a mixture of dilute sulphuric acid and sal-ammoniac, said cells being separated from each other by a water-tight packing applied to the edges of one of the elements, substantially as described.

In testimony whereof I affix my signature, in presence of two witnesses, this 26th day of July, 1888.

THOMAS H. HICKS.

Witnesses:
P. M. HULBERT,
JOHN SCHUMAN.

It is hereby certified that in Letters Patent No. 405,213, granted June 11, 1889, upon the application of Thomas H. Hicks, of Detroit, Mich., for an improvement in "Secondary Batteries," the name of the assignee was erroneously written and printed "Hinds Induction-Light and Motor Company, of Michigan," whereas said name should have been written and printed *Hicks Induction-Light and Motor Company, of Michigan;* that the proper correction has been made in the files and records pertaining to the case in the Patent Office, and should be read in the Letters Patent that the same may conform thereto.

Signed, countersigned, and sealed this 2d day of July, A. D. 1889.

[SEAL.]

CYRUS BUSSEY,
*Assistant Secretary of the Interior.*

Countersigned:

C. E. MITCHELL,
*Commissioner of Patents.*